(12) United States Patent
Lion

(10) Patent No.: US 7,971,748 B2
(45) Date of Patent: Jul. 5, 2011

(54) FLEXIBLE MOLD WITH GRASPING HANDLES

(75) Inventor: Mathieu Lion, Paris (FR)

(73) Assignee: Mastrad SA, Paris (FR)

( * ) Notice: Subject to any disclaimer, the term of this patent is extended or adjusted under 35 U.S.C. 154(b) by 306 days.

(21) Appl. No.: 12/202,124

(22) Filed: Aug. 29, 2008

(65) Prior Publication Data

US 2008/0314897 A1 Dec. 25, 2008

Related U.S. Application Data

(63) Continuation-in-part of application No. 10/854,865, filed on May 27, 2004, now Pat. No. 7,419,071.

(30) Foreign Application Priority Data

Sep. 17, 2003 (FR) ...................... 03 10940

(51) Int. Cl.
*B65D 6/34* (2006.01)
(52) U.S. Cl. ........ 220/771; 220/645; 220/653; 220/654; 220/758; 249/117; 249/127; 249/134; 249/154; 249/DIG. 1
(58) Field of Classification Search .................. 249/117, 249/122, 125, 127, 134, 139, 153, 154, 170, 249/DIG. 1, 114.1, 115; 220/4.23, 212.5, 220/323, 644–653, 675, 696, 771–772, 654, 220/758
See application file for complete search history.

(56) References Cited

U.S. PATENT DOCUMENTS

| | | | |
|---|---|---|---|
| 2,182,454 A | 8/1937 | Sherman | |
| 2,201,968 A * | 5/1940 | Fischer | 16/372 |
| 2,411,857 A | 12/1946 | Harriss | |
| 2,960,218 A | 11/1960 | Cheeley | |
| 3,278,074 A * | 10/1966 | Masaru | 220/212.5 |
| 3,844,525 A | 10/1974 | Parmett | |
| 4,080,884 A * | 3/1978 | Terrell | 99/433 |
| 4,165,855 A * | 8/1979 | Mason, Jr. | 249/102 |
| 4,191,517 A | 3/1980 | Byrd et al. | |
| 4,565,468 A | 1/1986 | Crawford | |
| 4,960,211 A | 10/1990 | Bailey | |
| 4,965,424 A | 10/1990 | Bagley | |
| 5,166,485 A * | 11/1992 | Arai et al. | 219/732 |
| 5,300,747 A | 4/1994 | Simon | |
| 5,463,794 A * | 11/1995 | Erland | 16/225 |
| 5,730,310 A * | 3/1998 | Yoshihara | 220/835 |
| 5,843,544 A * | 12/1998 | Andersen et al. | 428/36.5 |
| 6,279,771 B1 | 8/2001 | Bryant | |
| 6,700,106 B2 | 3/2004 | Cochran et al. | |
| 6,733,852 B2 | 5/2004 | Littlejohn et al. | |
| 6,994,225 B2 | 2/2006 | Hakim | |
| 7,032,773 B2 | 4/2006 | Dees et al. | |

(Continued)

FOREIGN PATENT DOCUMENTS

CH 443870 9/1967

(Continued)

*Primary Examiner* — Joseph S Del Sole
*Assistant Examiner* — Dimple Bodawala
(74) *Attorney, Agent, or Firm* — Cowan, Liebowitz & Latman, P.C.; Mark Montague, Esq.

(57) ABSTRACT

A flexible, silicone mold having a container and a peripheral rim that defines an opening to the container. Grasping zones are disposed along the rim and the grasping zones have sufficient dimensions to permit control of the geometry of the rim and also to permit control of the horizontal positions of the two grasping zones.

19 Claims, 3 Drawing Sheets

U.S. PATENT DOCUMENTS

| | | | |
|---|---|---|---|
| 7,105,193 B2 | 9/2006 | Yeung | |
| 7,419,071 B2 * | 9/2008 | Lion | 220/771 |
| 7,517,933 B2 * | 4/2009 | Holmes et al. | 524/588 |
| 2001/0004397 A1 | 11/2001 | Hompanera | |
| 2002/0088807 A1 * | 7/2002 | Perkovic et al. | 220/654 |
| 2002/0100372 A1 | 8/2002 | Bryant et al. | |
| 2002/0171027 A1 | 11/2002 | Martellato et al. | |
| 2003/0071188 A1 | 4/2003 | Bruno | |
| 2003/0089718 A1 | 5/2003 | Zinnbauer | |
| 2003/0192847 A1 | 10/2003 | Jahrling et al. | |
| 2004/0231527 A1 | 11/2004 | Brasset | |
| 2004/0249059 A1 | 12/2004 | Akbar et al. | |
| 2005/0034604 A1 | 2/2005 | Halliday et al. | |
| 2006/0083833 A1 * | 4/2006 | Pezzana et al. | 426/512 |
| 2007/0080163 A1 * | 4/2007 | Yeung | 220/675 |
| 2007/0267374 A1 | 11/2007 | Middelton et al. | |
| 2008/0314897 A1 * | 12/2008 | Lion | 220/9.4 |

FOREIGN PATENT DOCUMENTS

| | | | |
|---|---|---|---|
| DE | 3832524 | | 3/1990 |
| DE | 19922439 | | 11/1998 |
| DE | 10258644 | | 6/2004 |
| EP | 000278055 | | 8/1988 |
| EP | 0992195 | | 4/2000 |
| EP | 1132000 A1 | * | 9/2001 |
| EP | 1197149 | | 4/2002 |
| EP | 1197149 A2 | * | 4/2002 |
| FR | 1590193 | | 3/1970 |
| FR | 1590193 | | 4/1970 |
| FR | 2437590 | | 4/1980 |
| FR | 2493812 | * | 5/1982 |
| FR | 2747885 | | 10/1997 |
| FR | 2747886 | | 10/1997 |
| FR | 2786667 | | 9/2000 |
| FR | 2786668 | | 9/2000 |
| FR | 2827494 | | 1/2003 |
| GB | 1159021 | * | 7/1969 |
| GB | 2154860 | | 9/1985 |
| JP | 02002264548 | | 9/2002 |
| WO | WO 98/02045 | | 1/1998 |
| WO | WO 03/078012 A1 | * | 9/2003 |

\* cited by examiner

US 7,971,748 B2

FLEXIBLE MOLD WITH GRASPING HANDLES

REFERENCE TO RELATED APPLICATIONS

This is a continuation-in-part of U.S. application Ser. No. 10/854,865, filed May 27, 2004, which issued as U.S. Pat. No. 7,419,071 on Sep. 2, 2008, and which claims priority to French patent application no. 0310940, filed Sep. 17, 2003. The disclosure of U.S. application Ser. No. 10/854,865 is incorporated herein by reference.

FIELD OF THE INVENTION

The present invention concerns flexible silicone molds. More particularly, it concerns flexible silicone molds for food preparations, like cakes, pies, quiches, breads, etc. The silicone molds of the present invention can be placed in both an oven and a microwave at high temperatures. The molds can also be used to make, for example, ice cream and sherbets, and may be placed in freezers and the like.

BACKGROUND OF THE INVENTION

Flexible silicone molds for food preparation have long been known. The following patents and published patent applications disclose exemplary molds: U.S. Pat. Nos. 2,182,454; 3,844,525; 5,300,747; U.S. 2001/0043977, EP 0 992 195; EP 1 197 149; FR 1 590 193; FR 2 747 885; FR 2 747 886; FR 2 786 667; FR 2 786 668; FR 2 827 494; CH 443 870; and GB 1 159 021.

Molds made entirely of silicone are highly practical, because they permit easy release of products from the molds. They can also be easily cleaned after use.

However, molds made fully of silicone can pose handling and/or safety problems. A conventional silicone mold according to the prior art comprises a flexible silicone bowl, and a peripheral rim defining an opening. Because of their unduly high flexibility at the level of the rim of the opening, it is difficult to handle a mold and move it from one location to another, especially when filled with liquid. Very high flexibility of the rim can also produce deterioration of the food preparation during mold release. This difficult handling is particularly dangerous when the mold contains hot products or liquids.

The solutions proposed by the prior art to solve this difficult and/or dangerous handling problem have a tendency to reinforce the rim of the mold over the opening's entire periphery. This reinforcement is generally accomplished by adding to the rim a rigid ring over the entire periphery of the opening. This ring can be made of different materials and be of different shapes.

The solutions of the prior art, however, are not entirely satisfactory. Indeed, the mold loses its flexibility and is more difficult to clean after use. Its space requirements are always at least equal to the space requirements of the ring.

Moreover, the flatness, geometry and horizontal position of the rim are difficult to evaluate by a user of the mold. Owing to the fact that the reinforcement ring has a straight circular cross section, the user has no means to evaluate the flatness or horizontal position of the rim when holding the mold with two hands. A liquid contained in the mold can therefore be spilled during movement of the mold from one location to another. A user can no longer change the geometry of the rim, for example, for better mold release.

OBJECTS AND SUMMARY OF THE INVENTION

The current invention proposes a remedy for the drawbacks and disadvantages mentioned above.

One object of the invention is to provide a silicone mold that permits easy release of its contents, but is both easy and safe to handle.

Another object of the invention is to provide a mold, with a flatness, geometry and horizontal position of the opening that can easily be evaluated by the user, in order to avoid spilling of the contents, and to facilitate mold release.

A further object of the invention is to provide a flexible silicone mold that can easily be cleaned after use.

In accordance with the present invention, and contrary to what is proposed in the prior art which reinforces the rim over the entire periphery of the opening, substantially flat, opposite grasping zones are provided on the rim of the mold. This permits a user to handle the mold and move it from one location to another safely. The grasping zones, in particular, permit evaluation of the flatness of the rim, as well as its horizontal position. The mold therefore retains its flexibility at the level of the opening, and the user can control its geometry.

Further, and in accordance with the present invention, a flexible silicone mold is provided, comprised of a container and peripheral rim defining the opening of the container, that includes at least two generally flat, substantially opposite grasping zones on the rim, with the two zones having sufficient extent to permit a user to control the geometry of the rim, as well as the horizontal position and equal level of the two grasping zones.

As a feature of the invention, each grasping zone contains a substantially flat reinforcement embedded in the silicone.

As a further feature, each reinforcement is divided into two substantially symmetrical parts relative to an axis passing substantially through the center of the grasping zones.

As another feature, each half of the reinforcement contains an extension strip in the rim, and each strip connects two reinforcements of the two different grasping zones and thus covers substantially 180 degrees of the rim.

As yet a further feature, each reinforcement contains an extension strip in the rim extending on both sides of the reinforcement.

As yet another feature, the ends of the extension strips are substantially at the level of an axis perpendicular to an axis passing substantially through the center of the grasping zones, each strip thus covering substantially 180 degrees.

As yet an additional feature, the extension strips, or halves of the reinforcements, are connected by means that form a hinge, and the rim contains silicone material that is thicker than the walls of the container.

As still yet another feature, each extension strip is optionally substantially flat.

As still yet a further feature, the mold contains a reinforcement at the level of the base of the container.

As a further feature, the reinforcement contains a rim on the periphery of the base.

As an additional feature, the reinforcement contains a plate.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, in which.

DETAILED DESCRIPTION OF THE INVENTION

Figure 1:
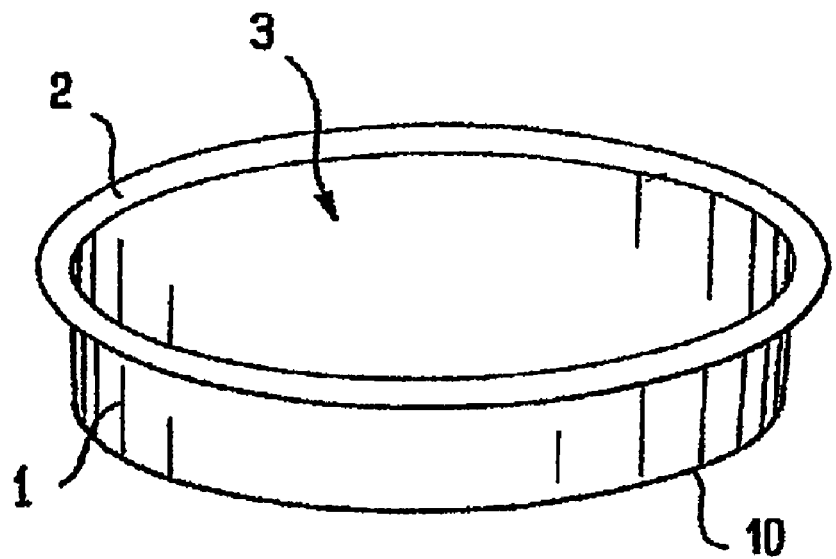
FIG. 1 schematically illustrates a prior art mold.

FIG. 1 shows a prior art mold. As shown, typical prior art molds include a container 1 and a peripheral rim 2, which define an opening 3. The container 1 includes a base portion 10.

Figure 2:
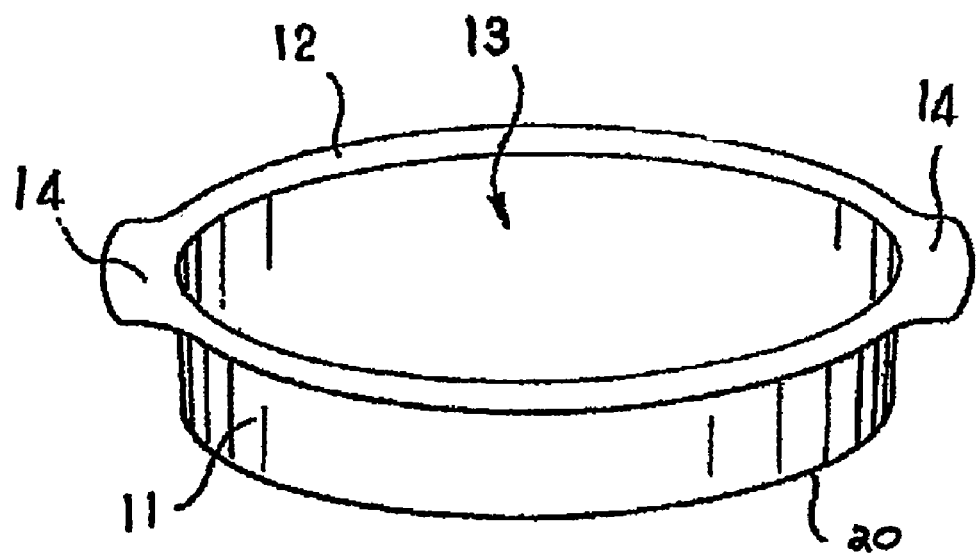
FIG. 2 schematically illustrates a mold according to a first embodiment of the present invention.

Turning now to FIG. 2, a flexible silicone mold (or simply called "mold" herein) in accordance with a first embodiment of the invention is shown. As shown in FIG. 2, the mold comprises a flexible container 11 made of rubber, such as silicone rubber, silicone (in its various forms), or other appropriate deformable material suitable for use. The container 11 includes a peripheral rim 12, defining an opening 13 of container 11.

The container 11 is designed to receive liquids and/or food preparations to be placed in an oven or freezer. It is recalled that the mold according to the invention can be used for cakes, pies, quiches, breads, etc. The mold according to the invention can also be used for ice creams and sherbets, for example. The mold is therefore made of food-grade rubber, such as silicone rubber, silicone (in its various forms), or other appropriate deformable material suitable for use which can withstand high and low temperatures similarly to silicone. In particular, it can be placed in a microwave oven. The container further may have multiple cavities so that it can be utilized to make multiple muffins, cupcakes, madeleines, tartlets, chocolate, candies, etc. Still further, multiple flavors of ice, sherbet and other items may be made within the same container have multiple compartments for the different flavored items.

The container 11 is generally a cylinder of revolution. It preferably has a shape that flares from the base 20 to rim 12, so that mold release of the preparation is facilitated. The interior diameter of the container at the level of rim 12, for example, is about 260 mm, whereas the diameter of base 20 is about 225 mm. While the illustrated container 11 is in the form of a bowl, container 11 may also be formed to comprise various other shapes and dimensions, as discussed below.

The peripheral rim 12 extends substantially parallel to base 20. The extent beyond the walls of the container, for example, is about 7 to 10 mm, or more. The rim 12 preferably has the same or thicker silicone material than the walls of container 11. For example, silicone at the level of the rim can be about 7 mm thickness or more, whereas the walls of the container are about 1.5 to 5 mm thick, for example. This excess thickness permits better mold release of the preparation.

The rim can contain at the level of the rim a collar of material in one piece with the walls of the container, further reinforcing this excess thickness.

Naturally, all the given numerical examples in the present description are non-limiting and can change depending on the application requirements of the mold.

The mold contains at least two generally flat, substantially opposite grasping zones 14 (handles) on rim 12 at the level of rim 12. The two zones 14 have sufficient dimensions to permit a user to pick up and move the mold. They allow the geometry of the rim 12 to be checked, as well as the horizontal position or levels of the two grasping zones 14, despite the flexibility of the intermediate zone of rim 12. Alternatively, the mold can include more than two grasping zones 14 (handles), each of which is disposed on differing portions of the rim 12 such that two or more grasping zones 14 (handles) are or are not directly opposed to one another.

Zones 14 can be substantially semicircular in shape. Each semicircle 14 extends on the rim 12 over a distance covering about 150 mm, for example, and extends radially, over a distance of about 35 to 50 mm at most. The example of the shape of each grasping zone is non-limiting. Each zone 14 can have any shape, for example, square, rectangular, trapezoid, etc. Each grasping zone 14 can also be covered with patterns that permit better grasping of zone 14 by the user, these patterns being optionally decorative as well. These patterns can be in the form of pins or relief of any shape integral with the material in zone 14. The surface of each zone 14 can also be roughened to offer anti-slip properties.

The fact that zones 14 are of sufficient extent permits a user to check the geometry of the intermediate zone of rim 12 and thus facilitates mold release and permits folding of the mold after its use. The zones 14 are flat, which offers the user references concerning the levels of the zones 14 relative to each other, as well as a reference concerning the horizontal position of the flexible rim 12. Handling the mold is thus facilitated and the safety increased.

Figure 3:
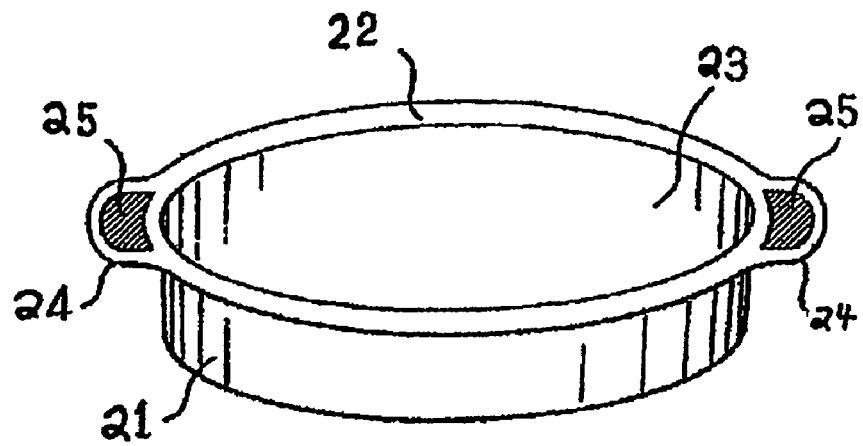
FIG. 3 schematically illustrates a mold according to a second embodiment of the present invention.

FIG. 3 schematically depicts a second embodiment of the mold according to the present invention. The embodiment shown in FIG. 3 is similar to the first embodiment shown in FIG. 2 and discussed above. In particular, the mold shown in FIG. 3 includes a container 21, a rim 22, which defines an opening 23, and zones 24. Each zone 24 contains a substantially flat reinforcement control member or members 25 that is/are positioned within a respective zone 24. As illustrated, reinforcement 25 is embedded in the silicone. Reinforcement 25 avoids deformation of the grasping zone 24, owing to the extent and flexibility of each zone 24.

Each reinforcement 25 also increases the control properties of the geometry and levels of each zone 24 by reinforcing possible grasp by the user without acting on the flexibility of rim 22. In this way, reinforcement 25 acts as a control member to control the extent of flexure of zones 24 and rim 22. Each reinforcement 25 can be made of rubber, such as silicone rubber (or other rubber having a higher shore value than that of the container), silicone (in its various forms), or other appropriate deformable material suitable for use which can withstand high and low temperatures similarly to silicone or silicone rubber, metal, plastic, fiber glass, glass, wood, wooden resins, concrete, ceramic, or, preferably, nylon. Reinforcement 25 can also be made of polyamide, such as NYLON, high temperature polyamide, such as ZYTEL, or liquid crystal polymer resins, such as ZENITE.

Each reinforcement 25 generally has the shape of each zone 24, so as to not affect the flexibility of flexible rim 22. For example, it is in the form of a semicircle or a rectangle.

As mentioned above, each reinforcement 25 is embedded within the handles 24. However, the reinforcements may be positioned with the handles 24 so as to be coupled to the silicone in various other manners. In particular, each reinforcement 25 may be coupled to the top or, alternatively, the bottom surface of each handle 24. Coupling of each reinforcement 25 to a respective handle can be done by use of a suitable strong adhesive or by any other known, suitable coupling technique. In yet another variation, the reinforcements may be inserted or disposed around the side exterior of the handles.

Figure 4:
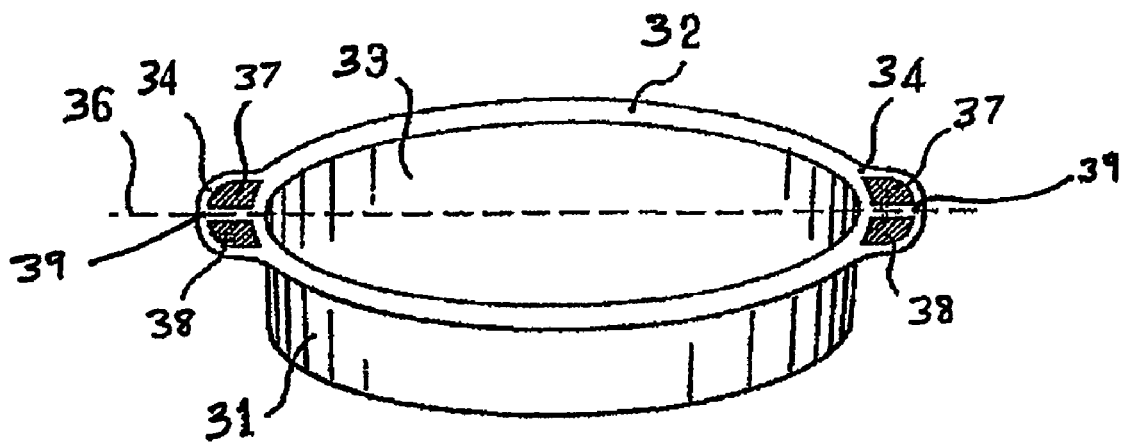
FIG. 4 schematically illustrates a mold according to a third embodiment of the present invention.

FIG. 4 schematically depicts a third embodiment of a mold according to the present invention. Like the previous embodiments, the mold shown in FIG. 4 includes a container 31, a rim 32, defining an opening 33, and zones 34.

Figure 5:
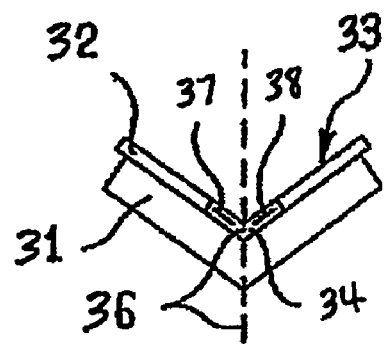
FIG. 5 schematically illustrates a radial view of the mold shown in FIG. 4, when deformed in accordance with the present invention.

According to the third embodiment, each zone includes two reinforcement parts 37 and 38 that are symmetrical relative to an axis 36 that passes through the center of each grasping zone 34. A gap 39 is disposed between each pair of reinforcement parts 37 and 38 principally to permit folding of the mold, as shown in FIG. 5. Folding along axis 36 permits better mold release of the preparation, as well as easier cleaning of the mold after use.

The sides of the halves of each reinforcement 37 and 38 situated near axis 36 are rounded and non-sharp. This avoids deterioration and cutting of the silicone during bending according to FIG. 5.

As a variation of the embodiment shown in FIG. 4, the two reinforcement halves 37 and 38 of each side of the mold are connected by a hinge or other appropriate connection means that is capable of allowing the bending of the mold as shown in FIG. 5.

As another variation, each reinforcement half 37 and 38 contains an extension strip that extends into rim 32. It is possible for one of the two reinforcement halves to contain such an extension strip. The extension strips preferably are flat. However, it can have any straight cross section, for example circular or square. Further, each extension strip can be made of rubber, such as silicone rubber (or other rubber having a higher shore value than that of the container), silicone (in its various forms), or other appropriate deformable material suitable for use which can withstand high and low temperatures similarly to silicone or silicone rubber, metal, plastic, fiberglass, glass, wood, wooden resins, concrete, a composite material, ceramic or, preferably, reinforced nylon. Each strip can be also be made of polyamide, such as NYLON, high temperature polyamide, such as ZYTEL, or liquid crystal polymer resins, such as ZENITE. Each strip may extend over any distance in rim 32. It can cover about 60 degrees on the rim, for example.

Figure 6:
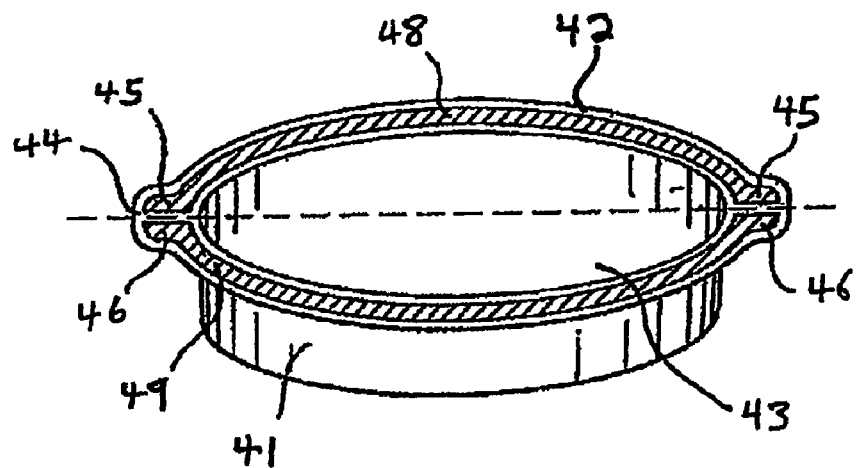
FIG. 6 schematically illustrates a mold according to a fourth embodiment of the present invention.

FIG. 6 depicts a mold in accordance with a fourth embodiment of the present invention. The mold of FIG. 6 includes a container 41, a rim 42, defining an opening 43, and grasping zones 44. Each zone 44 includes reinforcement parts 45 and 46 (similar to parts 37 and 38 in the embodiment of FIG. 4). In the embodiment of FIG. 6, the two reinforcement parts 45 are attached via an extension strip 48, and the two reinforcement parts 46 are attached via an extension strip 49. Thus, reinforcement part 48 traverses nearly 180 degrees (i.e., half) of the circular path of rim 42, and reinforcement part 49 traverses the other 180 degrees of rim 42. In other words, strip 48 connects the two halves 45 of the two opposite zones 44 and strip 49 connects the two halves 46 of the two opposite zones 44.

Given strips 48 and 49 in the embodiment shown in FIG. 6, the container is capable of bending in a manner similar to the embodiment shown in FIG. 4, thus being able to bend like that shown in FIG. 5.

In one variation of the embodiment shown in FIG. 6, each pair of halves 45 and 46 are connected by a hinge or other appropriate device.

Figure 7:
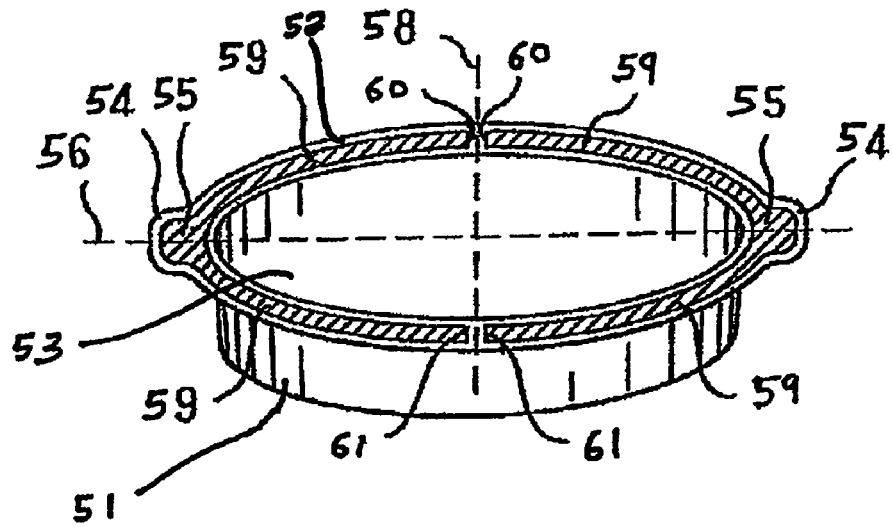
FIG. 7 schematically illustrates a mold according to a fifth embodiment of the present invention.

FIG. 7 schematically depicts a fifth embodiment of a mold according to the present invention. The mold shown in FIG. 7 includes a container 51, a rim 52, defining an opening 53, and two grasping zones 54. Each grasping zone 54 includes a respective reinforcement part 55. However, and different from the third and fourth embodiments discussed above, the fifth embodiment shown in FIG. 7 includes reinforcement parts 55 that are not divided into multiple halves (or parts). Rather, each reinforcement part 55 includes two sets of extension strips 59, as shown. But unlike embodiment 4 shown in FIG. 6, each extension strip 59 extends only 90 degrees along rim 52. Preferably, each reinforcement part 55 with their extensions 59 are made of a single piece of support material.

As mentioned with regard to the above embodiments, each extension strip 59 preferably is flat. However, they can have any cross section, for example, circular or square. Each strip 59 can be made of rubber, such as silicone rubber (or other rubber having a higher shore value than that of the container), silicone (in its various forms), or other appropriate deformable material suitable for use which can withstand high and low temperatures similarly to silicone or silicone rubber, metal, plastic, fiberglass, glass, wood, wooden resins, concrete, composite, ceramic, or, preferably, reinforced nylon. Each strip can be also be made of polyamide, such as NYLON, high temperature polyamide, such as ZYTEL, or liquid crystal polymer resins, such as ZENITE.

Figure 8:
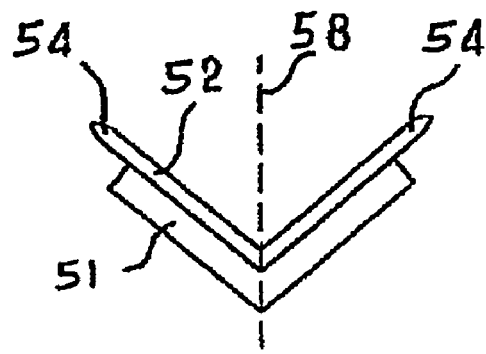
FIG. 8 schematically illustrates a radial view of the mold shown in FIG. 7, when deformed in accordance with the present invention.

The ends of the extension strips 59 are rounded and non-sharp. This avoids deterioration and cutting of the silicone during bending of the mold, as shown in FIG. 8.

Each strip 59 extends over any distance in rim 52. The strips 59 can vary in length extending along rim 52. For example, each strip 59 can extend from zone 54 different from that shown in FIG. 7. For example, each strip can extend, for example, 30, 60 or substantially 90 degrees (if two strips 59 extending from the same reinforcement part 55 is perceived to represent a single strip, then a strip can extend up to substantially 180 degrees, as shown in FIG. 7, but may extend, for example, 90 degrees, 120 degrees, etc.).

FIG. 7 shows the preferred version, where a first end 60 and a second end 61 of the extensions, as shown, are immediately adjacent to an axis 58 that is perpendicular to an axis 56 that passes through the center of the grasping zones 54. Each connected strip 59 thus covers substantially 180 degrees. It is apparent that this strip permits easier folding, as shown in FIG. 8, because of its extension in rim 52. It is noted that this folding is perpendicular to the folding shown in FIG. 5.

In a variation of this embodiment, each pair of ends 60 and 61 of the extension strips are connected by a hinge or other suitable foldable device.

For each of the embodiments discussed above, the versions containing extension strips generally have the same properties as the molds without the strip, in particular, control of the geometry of the opening (13, 23, 33, 43, 53) and control of the levels and horizontal position of the grasping zones, especially because the strips do not cover the entire rim, which permits bending of the rim.

In each of the embodiments discussed above, the reinforcements and extensions, if any, cooperate to control flexure of the rim and the handles when a user extends one or more of the handles and the rim beyond its respective horizontal position.

In this way, the reinforcements and/or extensions act to stabilize movement of the handles and the rim by lessening the flexibility that results from their material construction. This is particularly helpful in easing removal of a food preparation from the container, or, to avoid spilling of a material carried by the container when such a preparation is being carried for placement into an area such as a freezer or oven.

Furthermore, in the various embodiments and variations discussed above, the reinforcements and, if applicable, the extension strips may be coupled to the silicone in various manners in addition to embedding the reinforcements within the silicone. In particular, the reinforcements (and extensions, if any) may be coupled to the top or, alternatively, the bottom surfaces of the silicone of the handle and/or rim. Coupling can be done by use of a suitable strong adhesive or by any other known, suitable coupling technique. In addition, the reinforcements (and extensions, if any) may be inserted or disposed around the side exterior of the handle/rim.

The preceding discussion is applied to an opening that is generally circular or elliptical in shape and a container with a generally circular or elliptical cross section. However, the opening and the shape of the container can be different and be, for example, rectangular, square, triangular, star-shaped, heart-shaped, puzzle piece shaped, or, any combination thereof, etc. With each variation, the container may include multiple cavities or compartments, as previously mentioned. In such case, a single container can make multiple muffins, cupcakes, madeleines, tartlets, chocolate, candies, ice cream, and ice cubes, etc.

It is further contemplated to provide grasping zones (handles) and/or extension strips along the peripheral rim of the base of the container in the various embodiments discussed above. Such reinforcement at the base of the container, and thus at the bottom of the mold, also permits easier handling and mold release. Reinforcement at the base of the mold can include a peripheral rim arranged around the periphery of the base. The rim is preferably flat. However, it can have any cross section, for example, circular or square.

As another variation, the reinforcement can also be a punched or an unpunched plate, embedded in the base material.

The reinforcement can be made of rubber, such as silicone rubber (or other rubber having a higher shore value than that of the container), silicone (in its various forms), or other appropriate deformable material suitable for use which can withstand high and low temperatures similarly to silicone or silicone rubber, metal, plastic, fiberglass, glass, wood, wooden resins, concrete, composite, ceramic, reinforced nylon, polyamide, such as NYLON, high temperature polyamide, such as ZYTEL, or liquid crystal polymer resins, such as ZENITE, or other appropriate material, including, for example, polymers or copolymers compatible in the range of temperatures to which the container may be subjected, as well as any combination of the aforementioned.

The reinforcements and extensions addressed above can also have cross sections which are other than planar or flat, without affecting the flexibility of the container rim. For example, the reinforcements and extensions can be circular (as in the case of wire), square, oval, or otherwise non-planar in cross-section. Additionally, the overall shape and/or profile of the reinforcements and extensions may be concave, convex, parabolic, or otherwise non-linear.

Also, such reinforcement at the base can be applied to a mold not containing grasping zones or reinforcement along the mold's rim. Such reinforcement may be moveable on the base of the mold.

It is further contemplated that the hinge of the present invention can be lockable in a plurality of positions so as to allow the container to be fixed in a respective one of such positions to thereby, for example, add to the ease of release of materials from the container. Alternatively, such locking capability can also ease cleaning and storage of the container.

Such locking capability can include a locking mechanism suitable to prevent movement of one portion of a container handle relative to another portion of such handle. The locking mechanism can include, for example, segments of material made from the same or different material constituting the container, its reinforcements and extensions, or any portion thereof, and which are operatively connected, as by adhesive or other fastening or joining means, to either the top or bottom of a container handle, and which extend horizontally or otherwise non-linearly from one portion of the container to another portion thereof, whereby, for example, such extension may occur across one portion of the container handle to another portion of such handle, so as to brace movement of the handle and/or the container in a given position.

Additionally, while the above invention has been described and illustrated as having at least a pair of handles, the container can have multiple handles, which are positioned at various locations along the rim for use in controlling the container with either the placement or release of material with respect thereto. Further, such handles can be selectively attachable and removable to or from the container, respectively, and constructed of a material unlike that of the container, such that they can be removable from the container should the user desire to do so. Such capability eases, for example, placement of the container in a cooking device in instances in which space is limited due to the presence of other cooking containers as may be the case, for instance, when preparing multiple food items. The handles of the present invention, including the aforementioned, can also be made of a rigid material different from the container while accomplishing the objectives discussed above so as to allow the user to use one or more of the handles in managing movement of such handle or handles and of the container during placement or release of materials in or from the container. Attachment of the handles can be achieved by coupling them to adjacent portions of the rim through use of sufficient means such as glue, epoxy, or primer if the handles are to be permanently attached to the rim, or by, for example, clips if the handles are not to be permanently attached to the rim.

The handles of the present invention can include a cross-sectional area which is planar or non-planar, and a shape or profile which is linear or non-linear. In this way, a handle, or portion thereof, of the container of the present invention can include an area in cross-section, and/or a shape or profile, which match(es) that of its associated reinforcements and/or extensions.

In each of the embodiments above, the reinforcements are bordered about their periphery by portions of the handles not containing the reinforcements. Additionally, while each of the reinforcements and extensions of the present invention have been described as being embedded with the container, such reinforcements and extensions can also be selectively attachable and removable with respect to the container so as to afford the user further opportunity for increased, selective control in the use of the container.

Such reinforcements and extensions, or portions thereof, can also extend from their position within, respectively, a handle or the rim of the container of the present invention to a point which is beyond the periphery of the remainder of the container. In this way, such reinforcements and extensions increase the cross-sectional area of their respective handle, thereby further enhancing control of the container.

Additionally, the container portions of the present invention other than the reinforcements and extensions can be constructed of several materials. For instance, such construction can comprise one or more portions of the base can being made from ZYTEL, for example, or from another material addressed above as comprising the container, reinforcements or extensions, and one or more portions of the rim and the wall or walls of the container can be made of silicone, for example, or from another material addressed above as comprising the container, reinforcements or extensions. Therefore, the container in its entirety, including its reinforcements and extensions, can comprise a combination of one or more of the several materials addressed thus far.

Having described multiple embodiments of the present invention, and multiple variations for each of these embodiments, it is intended that the appended claims be interpreted as including the embodiments described herein, the alternatives mentioned above, and all equivalents thereto.

What is claimed is:

1. A flexible, silicone mold, comprising:
a container having a peripheral rim defining an opening of the container, the container and rim material being made of silicone; and
a plurality of grasping zones disposed along substantially opposite ends of the rim, the grasping zones having sufficient dimensions for receipt of reinforcement sections comprising a cross-sectional area which is less than that of the grasping zones, and adapted to permit control of a geometry of the rim and to permit control of horizontal positions of the grasping zones, the reinforcement sections being bordered about their periphery by portions of the grasping zones which are free of reinforcement.

2. The mold according to claim 1, further comprising a first reinforcement component positioned within one of the plurality of grasping zones, and a second reinforcement component positioned within another of the plurality of grasping zones.

3. The mold according to claim 1, further comprising reinforcement components positioned within one of the plurality of grasping zones, and reinforcement components positioned within another of the plurality of grasping zones, the reinforcement components for each of the grasping zones being symmetrically positioned relative to an axis passing substantially through a center of each of the grasping zones.

4. The mold according to claim 3, wherein the mold is adapted to be at least partially foldable along the axis passing substantially through the center of each of the plurality of grasping zones.

5. The mold according to claim 2, wherein the reinforcement components contain an extension strip extending along a respective portion of the rim.

6. The mold according to claim 3, further comprising a first extension strip extending from a reinforcement component of one of the grasping zones to one of the reinforcement components of the another of the plurality of grasping zones; and a second extension strip extending from another reinforcement component of said one of the grasping zones to another of the reinforcement components of said another grasping zone.

7. The mold according to claim 6, wherein the reinforcement components positioned within said one of the plurality of grasping zones are connected by a foldable hinge connection, and the reinforcement components positioned within said another of the plurality of grasping zones are connected by a foldable hinge connection.

8. The mold according to claim 1, further comprising a first reinforcement component positioned within one of the plurality of grasping zones, the first reinforcement component containing an extension strip that extends outward along the rim; the mold further comprising a second reinforcement component positioned within the another of the plurality of grasping zones, the second reinforcement component containing a respective extension strip that extends outward along the rim.

9. The mold according to claim 8, wherein each of the extension strips extends outward from both sides of the respective reinforcement component.

10. The mold according to claim 9, wherein each of the extension strips extends along the rim to a position immediately adjacent to an axis perpendicular to an axis passing substantially through a center of each of the grasping zones.

11. The mold according to claim 10, wherein corresponding ends of extension strips disposed immediately adjacent to the axis are connected by foldable hinge connections.

12. The mold according to claim 8, wherein each of the extension strips is optionally substantially flat.

13. The mold according to claim 1, wherein said rim has a thickness greater than a thickness of the container.

14. The mold according to claim 1, wherein the container includes a base portion and the mold further comprises a reinforcement at the base.

15. The mold according to claim 14, wherein said reinforcement at the base includes a peripheral rim on the periphery of the base.

16. The mold according to claim 14, wherein said reinforcement at the base includes a plate.

17. The mold according to claim 1, further comprising reinforcement components coupled to top surfaces of the plurality of grasping zones or other portions of the rim.

18. The mold according to claim 1, further comprising reinforcement components coupled to lower surfaces of the two grasping zones.

19. The mold according to claim 1, further comprising reinforcement components coupled to and around side surfaces of the two grasping zones.

* * * * *